Oct. 22, 1940.  A. KUHNS ET AL  2,218,990
METHOD AND MEANS FOR MAINTAINING GEAR TOOTH
ALIGNMENT BETWEEN PINIONS AND GEARS
Filed Nov. 23, 1938
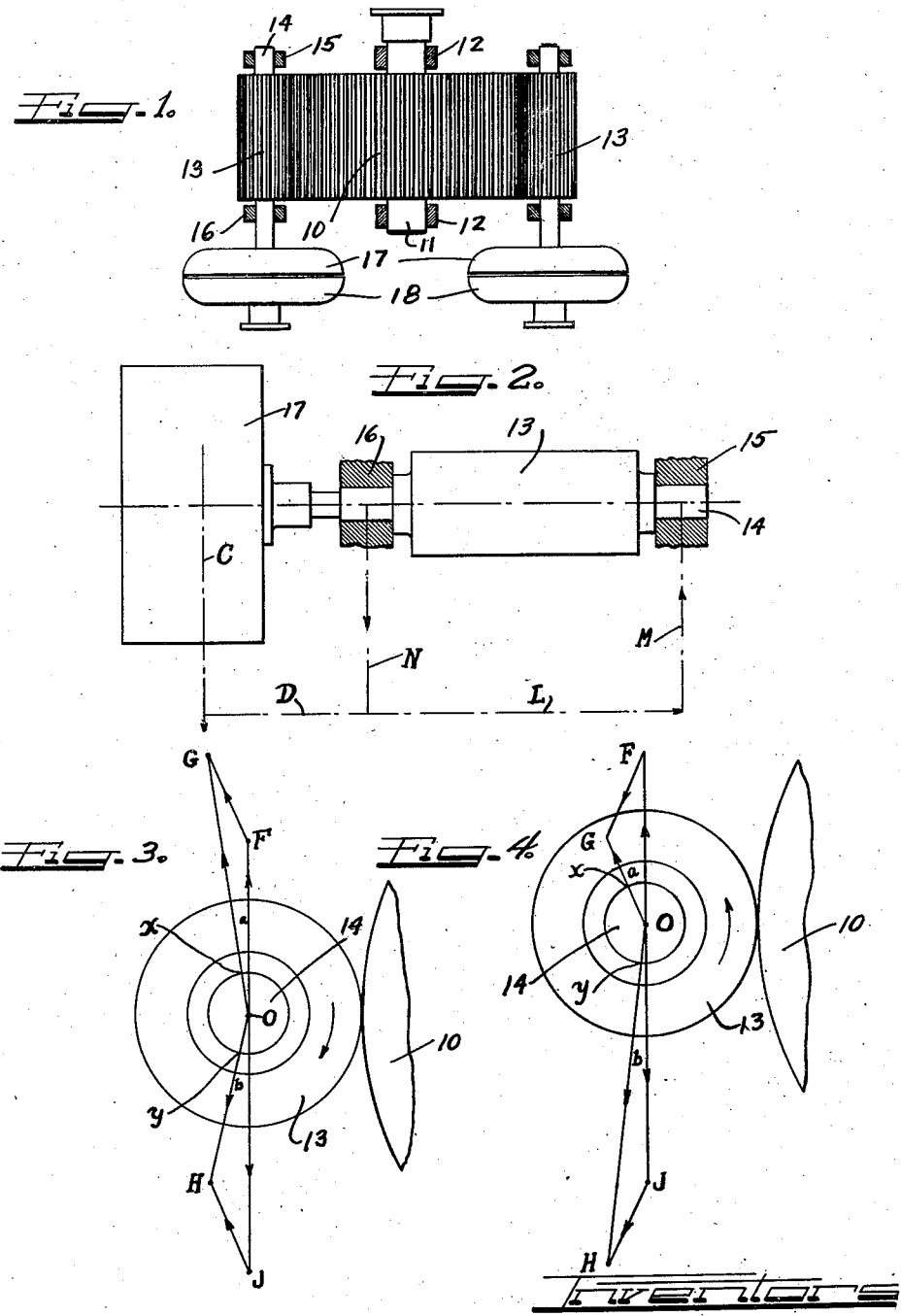
Inventors
Austin Kuhns.
Emil R. Gasser.

Patented Oct. 22, 1940

2,218,990

UNITED STATES PATENT OFFICE 2,218,990

METHOD AND MEANS FOR MAINTAINING GEAR TOOTH ALIGNMENT BETWEEN PINIONS AND GEARS

Austin Kuhns and Emil R. Gasser, Buffalo, N. Y., assignors to Farrel-Birmingham Company, Incorporated, Buffalo, N. Y., a corporation of Connecticut Application November 23, 1938, Serial No. 241,954

5 Claims. (Cl. 74—410)

The invention is of particular utility and importance in power transmission assemblies in which a driving pinion supporting shaft is journaled in bearings adjacent to the pinion and at one end carries a driving element such as the driving element or rotor of a coupling structure of the hydraulic, magnetic, turbine, or other type. For example, in marine or other propulsion systems, driving engines are connected with the impeller elements of hydraulic couplings whose rotor elements are connected with pinion shafts whose pinions mesh with a drive gear on the propulsion shaft. In such installations, a third bearing has usually been provided for each rotor element at the outer side thereof to assist the pinion shaft bearings to maintain proper alignment of the pinion shaft and the proper gear tooth alignment between the pinion and the propulsion gear. The third bearings for supporting the overhung weights of the coupling rotor elements are costly and usually difficult to install and are apt to become troublesome and therefore difficult to maintain.

The important object of our invention is therefore to provide arrangements and conditions which will eliminate the need of a third bearing and which will utilize the overhung weight to hold the pinion shaft in proper bearing engagement with its two bearings under all tooth loads and to maintain proper gear tooth alignment between the pinion and gear without change under all conditions of load and speed and direction of rotation.

The nature and advantages of our invention will be more fully understood from the following detailed description in connection with the accompanying drawing, in which drawing Figure 1 is a more or less diagrammatic plan view of a power transmission assembly to which my invention may be advantageously applied;

Figure 2 is a side elevation of one of the drive pinion assemblies shown on Figure 1;

Figures 3 and 4 are diagrammatic representations of the direction and relation of the various pressures and forces.

In the propulsion assembly of Figure 1 to which we have shown our invention applied, 10 represents a driven gear on a shaft 11 mounted in bearings 12 and adapted for connection with a member or apparatus to be driven, such for example as the propeller in marine craft.

The gear is meshed at its opposite sides by drive pinions 13 each secured on a shaft 14 journaled in bearings 15 and 16. At one end, each pinion shaft carries a drive element 17, diagrammatically shown, and this drive element may be the rotor element of a hydraulic, magnetic, or other coupling structure whose impeller element, indicated by 18, is coupled to a driving motor (not shown) such as a Diesel engine, electric motor or other driving source.

The rotor element may be of considerable weight, and heretofore, a third bearing has usually been provided for the rotor at the outer side thereof for assisting the pinion shaft bearings to maintain the proper alignment and rotation of the pinion shaft in its bearings for proper and efficient gear tooth alignment between the pinions and the gear driven thereby. Said third bearings usually are costly to install and difficult of proper maintenance. In accordance with our invention, we dispense with such third bearings and utilize the weight of the rotor or pinion shaft overhanging elements to maintain proper shaft alignment and gear tooth engagement under all conditions of load and speed and directions of rotation.

Referring to Figure 2, the line C extends vertically through the center of gravity of the overhung weight or rotor element 17, while the vertical lines M and N extend through the centers of the pinion shaft bearings 15 and 16, the line D indicating the distance between the center of gravity of the rotor element and the bearing 16, and the line L indicating the distance between bearing centers or fulcrum points. The weight of the rotor element and the pinion element, and the distances D and L are so selected that the overhung weight moments will at all times in combination with the tooth load between the pinion and the gear, irrespective of the direction of rotation, hold the pinion in proper tooth alignment with the gear, and so that the resultant bearing load at either of the bearings will vary in direction through only a small angle while the tooth load varies between zero and maximum, with the result that practically the same portions of the bearings are carrying the load at all times.

By a proper dimensioning and proportioning of the weights and the leverage spans, the weight load or pressure at the bearing 16 is always vertically down, and the pressure caused by the overhung weight or rotor 17 is always vertically up at the bearing 15, so that the pinion shaft at the bearing 16 is always held by the weight against the lower line of the bearing, and at the bearing 15 the shaft is always held up against the upper side of the bearing, and such pressure engagement is always in excess of the bearing pressures caused by the tooth load while the gear is driven by the pinion.

Referring to Figure 3, a pinion 13 is shown rotating in clockwise direction to drive the gear 10 in forward direction. The vertical line OF represents the vertical upward pressure of the shaft 14 against the bearing 15 by the overhung weight or rotor moment. To this upward bearing pressure load is added a bearing pressure resulting from the tooth load indicated by the line FG, the direction of this tooth load pressure being inclined by a small angle from the vertical due to the separating force acting between the pinion and gear so that the line OG will represent the resultant bearing pressure whose direction is inclined from the vertical by a small angle $a$, the bearing contact line $x$ having been shifted through this small angle away from the upper bearing line. The angle $a$ represents the angular shift of the bearing line under maximum tooth load, and under less than maximum tooth load the angular shift is correspondingly less.

On Figure 3 the line OJ represents the vertical downward pressure at the bearing 16 caused by the weight load, and the line JH represents the bearing pressure caused by the tooth load with the pinion rotating in clockwise direction, the tooth load bearing pressure being in a direction at a slight angle with the vertical and counteracting part of the load pressure OJ, the resultant bearing pressure being indicated by the line OH in a direction slightly inclined from the vertical by the angle B, the resultant bearing line $y$ being displaced only a few degrees from the lower bearing line.

Figure 4 diagrammatically represents the condition for rotation of the pinion in anti-clockwise direction. At the bearing 15, OF represents the vertical upward force when the pinion is at rest, and FG represents the pressure due to tooth load, this pressure being downwardly on the pinion shaft and at a small angle from the vertical line, and the resultant bearing load will be represented by the line OG, the direction of the resultant pressure being at the comparatively small angle $a$ from the vertical.

At the bearing 16, the normal downward pressure is indicated by the line OJ and the tooth load added to the weight load is indicated by the line JH which will be at an angle with the vertical, and the resultant downward bearing load is indicated by the line OH. When the pinion is driving at maximum load, the bearing line at the bearing 16 is at $y$ and at the bearing 15 the bearing line is at $x$, these bearing lines being displaced by only a few degrees from the vertical line.

It will thus be seen that, by proper dimensioning of the weights and moments, the pressure at the bearing 16 will always be vertically downwardly along the lower bearing line and at the bearing 15 will be vertically upwardly against the uppermost bearing line when the pinion is at rest, and when the pinion is in operation, the bearing lines will be shifted only a few degrees from the vertical so that the directions of the resultant loads in the bearings vary only through small angles thereby constraining the journal to run in practically the same relative position to the gear for either full transmitted load or no load, the correct alignment of the pinion and gear being thus substantially maintained regardless of the transmitted load. If the overhung weight is not sufficient to maintain without change the position of the pinion shaft as the tooth load increases, the position of the shaft will alter by as much clearance as there is in the respective bearings and the bearing lines may shift substantially 180°, and a condition of unequal loading and faulty operation would result unless a third bearing were provided for the overhung weight. However, with our arrangement the third bearing is eliminated and proper bearing condition and tooth alignment are efficiently maintained.

We have disclosed a practical and efficient embodiment of our invention but we do not desire to be limited to the exact arrangement shown and described as changes may be made without departing from the scope and spirit of the invention.

We claim as follows:

1. In combination, a gear, a pinion meshing with said gear, means to impose a predetermined maximum driving torque to said pinion, means to maintain the teeth of said pinion in aligned meshing relation with the teeth of said gear irrespective of the direction of rotation of said pinion while the tooth load of said pinion is less than a predetermined maximum, said last-mentioned means comprising a pair of spaced bearings, a shaft journaled in said bearings and having an end portion extending outwardly of one of said bearings to provide an outer lever integral with the inner lever provided by the portion of the shaft between the bearings, said pinion being disposed on said inner lever, and said first-mentioned means including a weighted element on said outer lever and cooperable therewith to produce a moment about said one bearing exceeding the moment of said inner lever and its tooth load, whereby to effect an upward thrust of said shaft on the bearing remote from said one bearing.

2. In a driving assembly including driving means to impose a predetermined maximum tooth load on the pinion, a pair of spaced bearings, a shaft journaled in said bearings and having an end portion extending outwardly of one of said bearings to provide a lever extending outwardly of said one bearing and integral with the shaft portion between the bearings, said shaft portion acting as a lever extending inwardly of said one bearing, a gear, a pinion on said shaft and disposed between the bearings and in mesh with said gear, and an element forming a part of the driving means mounted on said end portion and of a weight cooperable with said outer lever and said inner lever to effect an upward thrust by the shaft on the bearing remote from said one bearing, so that the resultant bearing load on said pair of bearings will vary in direction through only a small angle while the tooth load on said pinion varies between zero and a predetermined maximum.

3. A driving assembly comprising a pair of spaced bearings, a shaft journaled in said bearings and having an end portion extending outwardly of one of said bearings to provide a lever extending outwardly of said one bearing and integral with the shaft portion between the bearings, said shaft portion acting as a lever extending inwardly of said one bearing, a gear, a pinion on said shaft and disposed between the bearings and in mesh with said gear, a driving element mounted on said end portion to provide an overhung weight cooperable with said outer lever and said inner lever to effect an upward thrust by the shaft on the bearing remote from said one bearing, means to drive said element with a predetermined maximum torque, the moment of said weighted outer lever about said one bearing being adapted so that the resultant bearing load on said pair of bearings will vary in direction through only a small angle while the tooth load on said pinion varies between zero and a predetermined maximum.

4. In a driving assembly including driving means to impose a predetermined maximum tooth load on the pinion, means operable to maintain the teeth of the pinion in aligned meshing relation with the teeth of the gear irrespective of the direction of rotation, said last-mentioned means comprising a pair of spaced bearings, a shaft journaled in said bearings and having an end portion extending outwardly of one of said bearings, a pinion on said shaft and disposed between said bearings and meshing with the teeth of a gear, a gear, and a driving element on the outer end of said shaft included in said driving means adapted to provide an overhung weight cooperable with said shaft and said bearings to effect an upward thrust of the shaft on the bearing remote from said element and maintain the teeth of the pinion in alignment with the teeth of the gear while the tooth load is less than a predetermined maximum.

5. In a driving assembly including driving means to impose a predetermined maximum tooth load on the pinion, a pair of spaced bearings, a shaft journaled in said bearings and having an end portion extending outwardly of one of said bearings, a gear, a pinion on said shaft and disposed between said bearings and in mesh with said gear, an element included in said driving means and of considerable weight in relation to the weight of said shaft, said pinion, and the tooth load on said pinion, said element being mounted on the outer end of said shaft and adapted to cooperate with said shaft and said bearings so that the resultant bearing load at said bearings will vary in direction through only a small angle while the tooth load on said pinion varies between zero and a predetermined maximum, said element being arranged cooperable with said shaft and the bearing adjacent said weight to effect an upward thrust of the shaft on the bearing remote from said element.

AUSTIN KUHNS.
EMIL R. GASSER.